United States Patent [19]
Ishizu et al.

[11] Patent Number: 5,327,241
[45] Date of Patent: Jul. 5, 1994

[54] VIDEO SIGNAL PROCESSING APPARATUS FOR REDUCING ALIASING INTERFERENCE

[75] Inventors: Atsushi Ishizu, Takatsuki; Masaki Tokoi, Neyagawa; Yoshio Seki, Osaka, all of Japan

[73] Assignee: Matsushita Electric Industrial Co., Ltd., Osaka, Japan

[21] Appl. No.: 915,551

[22] Filed: Jul. 20, 1992

[30] Foreign Application Priority Data
Jul. 19, 1991 [JP] Japan .................... 3-179474
Jul. 25, 1991 [JP] Japan .................... 3-186115

[51] Int. Cl.⁵ ........................................ H04N 5/213
[52] U.S. Cl. ...................................... 348/606; 348/424
[58] Field of Search ............... 358/167, 36, 140, 141, 358/12, 138; H04N 7/04, 5/213, 11/02

[56] References Cited
U.S. PATENT DOCUMENTS

| | | |
|---|---|---|
| 4,745,459 | 5/1988 | Ninomiya et al. |
| 4,967,271 | 10/1990 | Campbell et al. |
| 4,984,077 | 1/1991 | Uchida ............... 358/140 |
| 4,989,090 | 1/1991 | Campbell et al. |
| 5,018,010 | 5/1991 | Masumoto ......... 358/167 X |
| 5,043,798 | 8/1991 | Emori. |
| 5,150,207 | 9/1952 | Someya ............... 358/12 |
| 5,168,358 | 12/1992 | Ishizu et al. ........ 358/140 |

FOREIGN PATENT DOCUMENTS
1320887  12/1989  Japan.

Primary Examiner—Victor R. Kostak
Attorney, Agent, or Firm—Wenderoth, Lind & Ponack

[57] ABSTRACT

In a video signal processing apparatus for restoring a signal which has been bandwidth-compressed by offset sub-sampling after restoring an image from sample points of a same field of a sub-sampled signal, a first adder performs an inter-field averaging process from inter-field signals before or after three adjacent fields. A second adder performs an inter-frame averaging process from inter-frame signals. One field difference and one frame difference are detected from the three adjacent inter-field signals thereby switching an output signal of the first adder and an output signal of the second adder in accordance with the magnitudes of the differences thus detected. In this way, aliasing interferences accompanied with bandwidth compression can be detected. By selecting an optimum eliminating filter, aliasing interference due to interfield sub-sampling and aliasing interference due to inter-frame sub-sampling can be eliminated.

12 Claims, 10 Drawing Sheets

AVERAGING WITH FRONT FIELD

AVERAGING WITH BACK FIELD

PRESENT FIELD ITSELF

VIDEO SIGNAL PROCESSING APPARATUS FOR REDUCING ALIASING INTERFERENCE

BACKGROUND OF THE INVENTION

1. Field of the Invention

This invention relates to a video signal processing apparatus for restoring a high definition television signal which has been subjected to bandwidth compression using a sub-Nyquist sub-sampling method and transmitted.

2. Description of the Prior Art

A high definition television (HDTV) signal has a frequency bandwidth exceeding 20 MHz and must be subjected to bandwidth compression when transmitted using a satellite or the like. As an effective method for broadly compressing a frequency bandwidth of an HDTV signal, a sub-Nyquist sub-sampling method is known. For which, a multiple sub-Nyquist sampling encoding (MUSE) system, a high definition-multiple analog component (HD-MAC) system and the like have been proposed. (See Y. Ninomiya, et. al., "An HDTV Broadcasting System Utilizing a Bandwidth Compression Technique—MUSE", IEEE Trans. Vol.BC-33, No.4, pp.130, 1987, and F. W. P. Vreeswijk, et. al., "HD-MAC Coding for Compatible Broadcasting of HDTV Signals", Symposium record Broadcast Session 1989, pp.37 to 53.)

With these methods, as shown in FIG. 11, an offset sub-sampling is carried out in an inter-field and inter-frame manner to transmit a quarter of the sample points of an original signal and as a result, the perfect picture is transmitted in a four-field mode, so that the bandwidth of the original signal is compressed to ¼ of its original bandwidth. On the receiving side, an untransmitted sample point (non-sample point) is interpolated from the transmitted sample point, thus restoring the original signal. For example, for the stationary area, interpolation is effected using all sample points of the present field and three past fields. On the other hand, for the moving area, interpolation is effected using only an intra-field sample point that has been transmitted.

As explained above, the stationary area and moving area have different interpolating methods. As a result, on the receiving side, the motion of an image is detected and an image interpolated for the stationary area and an image interpolated for the moving area are mixed with each other in accordance with the motion of an image thus detected, thus restoring the image.

Since such processings as explained above are effected on both the transmitting and receiving sides, one can enjoy high definition television broadcasts at home. However, the above-mentioned signal processing circuit (decoder) is extremely expensive and it is estimated that it will take a considerably long period of time for make it popular to home-use. Under such a circumstance, in order to make it possible to display and reproduce an image with any standard type television set and video tape recorder (VCR) currently popular to home-use, there is a known apparatus for converting that high definition television signals of the MUSE system into current standard type television signals using a TV signal standard converter, namely, MUSE-NTSC converter and, a video signal processing apparatus for performing interpolation in order to restore an image with a simple structure has been proposed.

As a conventional video signal processing apparatus for this purpose, see, for example, "MUSE/NTSC Converter for EDTV", Technical Report of the Institute of Television Engineers of Japan 1990 BCS90-3 pp.13 to 18.

With a conventional video signal processing apparatus as shown in FIG. 9, an inputted MUSE signal is fed to an interpolating circuit to interpolate a non-sample point from an intra-field sample point in order to restore a bandwidth-compressed signal. The signal subjected to an intra-field interpolating process, which is equivalent to the moving image processing of an MUSE decoder, in the interpolating circuit has the signal transmission characteristics as shown in a frequency characteristics chart of FIG. 12(a). As a result, for the stationary area, the high resolution component of a high definition television signal by offset sub-sampling of the MUSE system, as shown in a frequency characteristics chart of FIG. 12(b), is reproduced as an aliasing interference, resulting in a degradation of the in image quality. Then, the signal thus which has been processed through the interpolating circuit is fed to a frame memory to delay it one frame period and then, the signal thus which has been one-frame delayed and the signal which has been interpolation processed are subjected to an inter-frame averaging process through an adder, thereby producing a signal in which aliasing interference due to inter-frame offset sub-sampling has been eliminated. In this case, however, with the moving image, the inter-frame averaging process makes it possible for a double image to occur, resulting in a degradation in image quality. As a result, a motion detection circuit detects a motion of an image, and the inter-frame averaged signal and the signal which has been only intra-field interpolated through the interpolating circuit are mixed with other in a mixing circuit in accordance with the motion of the thus detected image, so that even with the moving image, such a signal can be obtained which has no degradation in image quality as well as eliminating aliasing interference due to inter-frame offset sub-sampling.

With the structure as above, however, by performing the inter-frame averaging process, aliasing interference due to inter-frame offset sub-sampling can be eliminated thereby causing a flicker component of 15 Hz to disappear, but the bandwidth-compressed MUSE signal also contains aliasing interference due to inter-field offset sub-sampling. As a result, a high frequency band component exceeding a horizontal frequency of 12 MHz is reproduced as a flicker component of 30 Hz while being aliased to a vertical high frequency band, so that a problem arises in that the interference incompatibly visibly appears in a notched pattern in the vertical line area of an image so as to be attached thereto.

In addition, another video signal processing apparatus is disclosed in, for example, Japanese Laid-Open Patent Application No.02-328707, "Video Signal Standard Converting Apparatus".

With a conventional video signal processing apparatus as shown in FIG. 10, similar to the apparatus shown in FIG. 9, an inputted MUSE signal is subjected to interpolation of a non-sample point from an intra-field sample point in an interpolating circuit in order to restore a bandwidth-compressed signal. The thus interpolated signal is fed field memories connected in series thereto, and then, a median-value signal of three adjacent inter-field signals is output by a median-value signal selector. An output signal from the median-value signal selector and output signals from the field memories are averaged by an adder to obtain an average-value signal of the signals which are in an inter-field correlation with each other, thus making it possible to obtain a signal in which the aliasing interference due to inter-field offset sub-sampling is eliminated. Here, the averaging process of highly correlated inter-field signals between three adjacent signals is carried out adaptively, so that the aliasing interference due to inter-field offset sub-sampling of the MUSE system can be eliminated without giving any effect to the moving image.

With the structure as above, however, by performing an optimum inter-field averaging process between three adjacent fields, the aliasing interference due to inter-field offset sub-sampling can be eliminated and as a result, the flicker component of 30 Hz which visibly appears in a notched pattern in the vertical line area of an image so as to be attached thereto can be eliminated. However, the bandwidth-compressed MUSE signal still contains the aliasing interference due to inter-frame offset sub-sampling thus creating a problem in that a flicker component of 15 Hz remains in the oblique component of the image.

SUMMARY OF THE INVENTION

An object of this invention is to provide a video signal processing apparatus capable of eliminating both aliasing interference due to inter-frame offset sub-sampling and aliasing interference due to inter-field offset sub-sampling.

In order to attain the above-mentioned object, a video signal processing apparatus of this invention comprises an interpolating circuit for interpolating a non-sample point from intra-field sample points in order to restore a high definition television signal which has been bandwidth-compressed by offset sub-sampling, a first memory for delaying a signal thus interpolated for one field period, a second memory for delaying an output signal of the first memory for a further one field period, a first adder for performing an adjacent inter-field averaging process from input and output signals of the first and second memories, a second adder for performing an inter-frame averaging process from an input signal of the first memory and an output signal of the second memory, a correlation discriminating circuit for detecting one field difference and one frame difference from input and output signals of the first and second memories and for outputting a switching signal in accordance with magnitudes of the differences thus detected, and a signal switching circuit for switching an output signal of the first adder and an output signal of the second adder in accordance with the output switching signal from the correlation discriminating circuit. Preferably, this apparatus may further comprise a motion detection circuit for detecting a motion of an image from an input signal of the first memory and an output signal of the second memory, and a mixing circuit for mixing an output signal of the signal switching circuit and an input/output signal of the first memory in accordance with the motion of an image thus detected.

Another video signal processing apparatus of this invention comprises a first memory for delaying the bandwidth-compressed high definition television signal for one field period, a second memory for delaying an output signal of the first memory for a further one field period, first and second and third interpolating circuits for interpolating non-sample points from intra-field sample points in order to restore a sub-sampled signal in accordance with input and output signals of the first and second memories, a first adder for performing an adjacent inter-field averaging process from output signals of the first, second and third interpolating circuits, a second adder for performing an inter-frame averaging process from an output signal of the first interpolating circuit and an output signal of the third interpolating circuit, a correlation discriminating circuit for detecting one field difference and one frame difference from output signals of the first, second and third interpolating circuits and for outputting a switching signal in accordance with magnitudes of the differences thus detected, and a signal switching circuit for switching an output signal of the first adder and an output signal of the second adder in accordance with the switching signal from the correlation discriminating circuit. This apparatus may further comprise a motion detection circuit for detecting a motion of an image from an output signal of the first interpolating circuit and an output signal of the third interpolating circuit or from an input signal of the first memory and an output signal of the second memory, and a mixing circuit for mixing an output signal of the signal switching circuit and an output signal of the first or second interpolating circuit in accordance with the motion of an image thus detected.

As arranged as above, a television signal subjected to intra-field interpolation is supplied to two memories. Then, an inter-field averaging process is performed between the present field and correlative adjacent field before or after for eliminating aliasing interference due to inter-field offset sub-sampling, and an inter-frame averaging process is performed for eliminating aliasing interference due to inter-frame offset sub-sampling. The larger of these aliasing interferences is discriminated in accordance with the magnitudes of an inter-field difference and an inter-frame difference to be switched. Accordingly, not only the aliasing interference due to inter-field offset sub-sampling but also the aliasing interference due to inter-frame offset sub-sampling can be eliminated. In addition, the motion of an image is detected, and the signal subjected to the inter-field averaging process between the present field and correlative adjacent field before or after, the signal subjected to the inter-frame averaging process, and the signal subjected to the intra-field interpolation are mixed with each other. Accordingly, even in the case of a moving image, degradations including the occurrence of double image can be prevented.

Furthermore, as arranged as above, such aliasing interferences that are caused by inter-field and inter-frame offset sub-samplings can be eliminated. At the same time, a memory for storing signals before interpolation is provided thereby making a reduction in the memory capacity possible.

DESCRIPTION OF THE PREFERRED EMBODIMENTS

Figure 1:
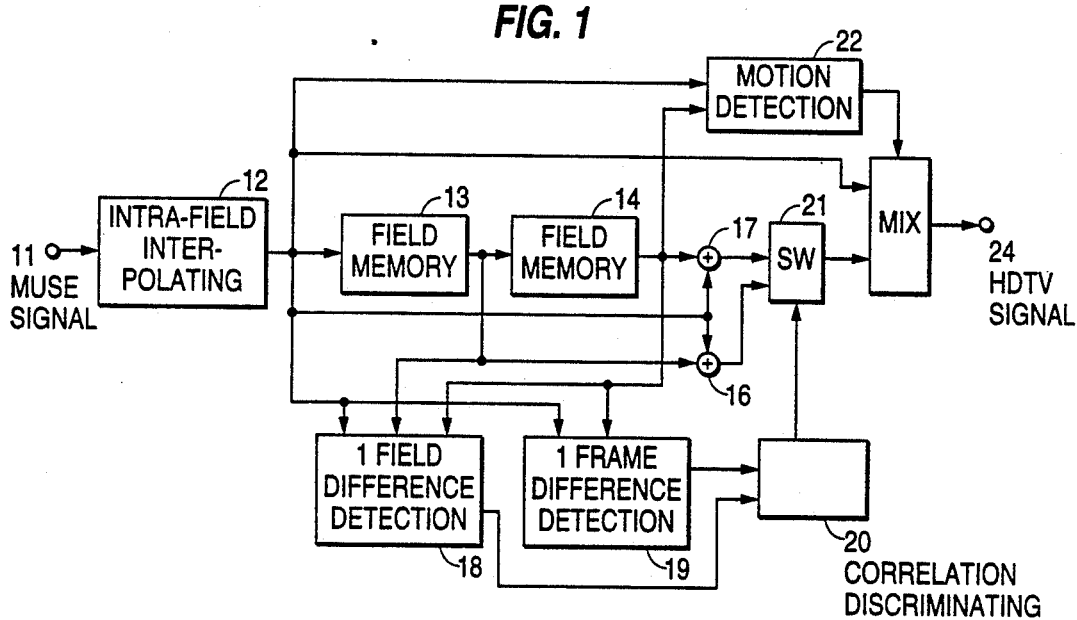
FIG. 1 is a block diagram of a video signal processing apparatus for reducing aliasing interference according to a first embodiment of this invention.

FIG. 1 is a block diagram of a video signal processing apparatus for reducing aliasing interference according to a first embodiment of this invention, which comprises an input terminal 11 for receiving a high definition television signal which has been bandwidth-compressed by offset sub-sampling (hereinafter typically expressed as a MUSE signal), an interpolating circuit 12 for interpolating a non-sample point from an inter-field sample point in order to restore a bandwidth-compressed signal, field memories 13 and 14, adders 16 and 17 each for performing an averaging process, a one field difference detection circuit 18 for detecting aliasing interference due to inter-field offset sub-sampling, a one frame difference detection circuit 19 for detecting aliasing interference due to inter-frame offset sub-sampling, a correlation discriminating circuit 20 for determing the larger of the inter-field and inter-frame aliasing interferences, and a signal switching circuit 21, and further comprising a motion detection circuit 22, a mixing circuit 23, and an output terminal 24 for outputting a high definition television signal having aliasing interferences eliminated therefrom.

With the apparatus structured as above, the operation will be explained below.

The MUSE signal inputted from the input terminal 11 is fed to the interpolating circuit 12 to interpolate a non-sample point from inter-field sample points in order to restore a bandwidth-compressed. Next, the signal interpolated signal is fed to the field memories 13 and 14 connected in series. An output signal of the interpolating circuit 12 and an output signal of the field memory 13 are subjected to inter-field averaging process through the adder 16 to obtain a signal having aliasing interference due to inter-field offset sub-sampling eliminated. On the other hand, the output signal of the interpolating circuit 12 and an output signal of the memory 14 are subjected to inter-frame averaging process through the adder 17 to obtain a signal having aliasing interference due to inter-frame offset sub-sampling eliminated. In addition, input and output signals of the field memories 13 and 14 are respectively fed to the one field difference detection circuit 18 and one frame difference detection circuit 19 to detect aliasing interference due to inter-field offset sub-sampling and aliasing interference due to inter-frame offset sub-sampling, and fed to the correlation discriminating circuit 20 to discrimine the larger one of the inter-field and inter-frame aliasing interferences. Thus, the signal switching circuit 21 controls the signal having no aliasing interference due to inter-field offset sub-sampling outputted from the adder 16 and the signal having no aliasing interference due to inter-frame offset sub-sampling outputted from the adder 17 so as to transmit a signal having the larger of the inter-field and inter-frame aliasing interferences eliminated.

In addition, the motion detection circuit 22 detects the motion of an image from the input signal of the field memory 13 and the output signal of the field memory 14. The signal outputted from the signal switching circuit 21, which is obtained by switching through the circuit 21 the signal subjected to inter-field averaging process before or after and the signal subjected to inter-frame averaging process, and the signal subjected to intra-field processing only outputted from the interpolating circuit 12 are mixed with each other through the mixing circuit 23 in accordance with the motion of the thus detected image. Accordingly, even in the case of a moving image, no degradation (occurrence of a double image) results, so that a signal that has aliasing interferences substantially eliminated can be obtained from the output terminal 24.

Figure 2:
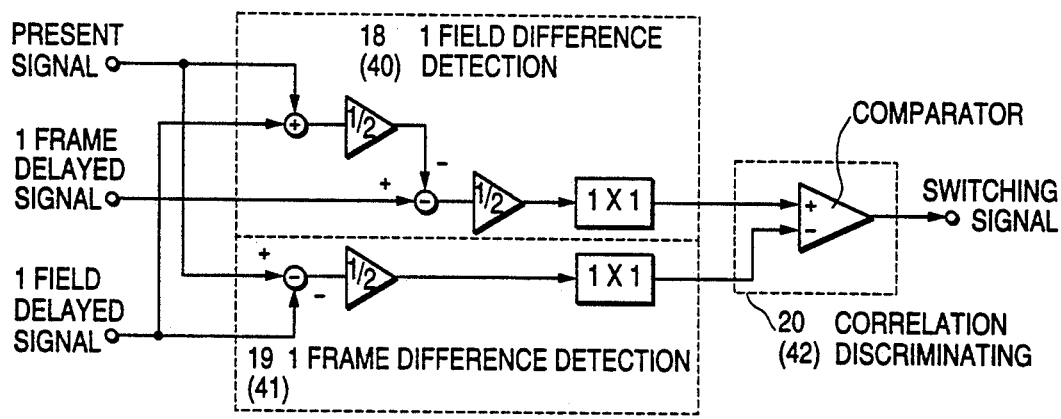
FIG. 2 is a block diagram showing in detail a circuit for detecting inter-field and inter-frame aliasing interferences taking place in the apparatus shown in FIG. 1.
Figure 3:
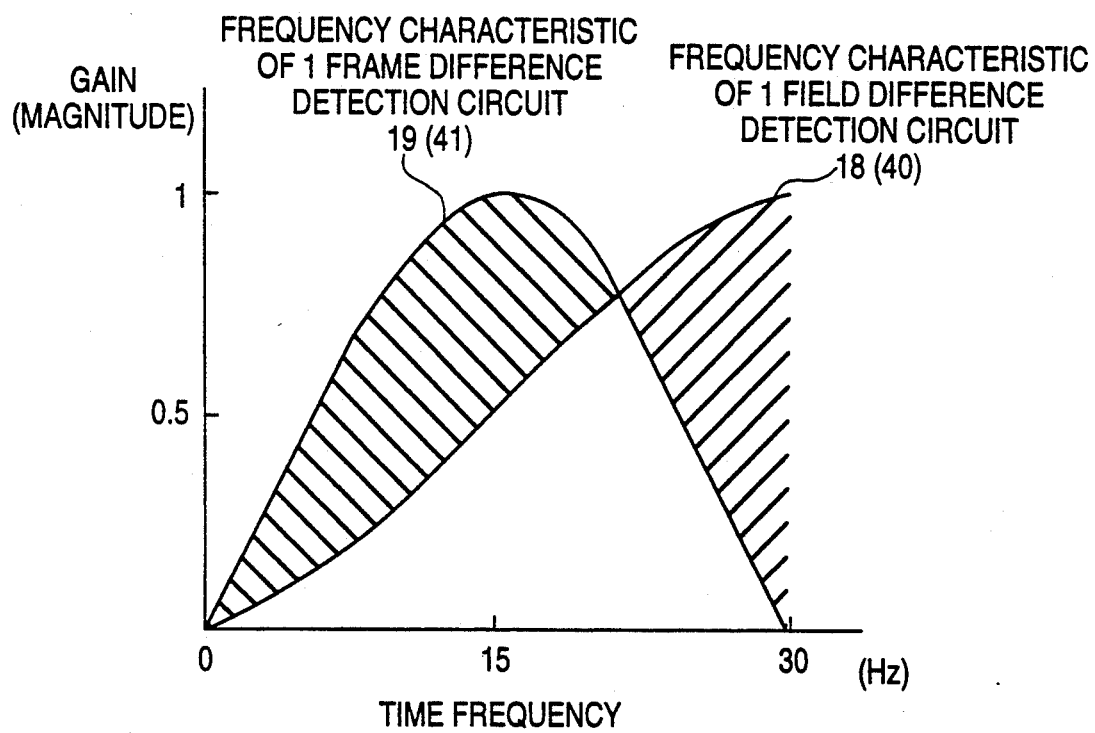
FIG. 3 is a characteristics chart for explaining the operation of detecting aliasing interferences in the apparatus shown in FIG. 1.

As explained above, according to this embodiment, an intra-field interpolation equivalent to the moving image process of an MUSE decoder is carried out in the interpolating circuit 12. Then, for the aliasing interference to be induced the case of a stationary image, the inter-field averaging process of the output signal of the interpolating circuit 12 and the output of the field memory 13 is carried out through the adder 16 to obtain such a signal that has no aliasing interference due to inter-field offset sub-sampling. At the same time, the inter-frame averaging process of the output signal of the interpolating circuit 12 and the output signal of the field memory 14 is carried out through the adder 17 to obtain a signal that has no aliasing interference due to inter-frame offset sub-sampling. Then, with these two signals, in order to detect the state of inter-field and inter-frame aliasing interferences from the signals of three adjacent fields, the one field difference detection circuit 18 for detecting the absolute value of an inter-field difference from these signals of the three adjacent fields, the one frame difference detection circuit 19 for detecting the absolute value of an inter-frame difference therefrom and the correlation discriminating circuit 20 for comparing these differences to detect the larger of them in magnitude are disposed as shown in FIG. 2. As shown in FIG. 3, in accordance with the value of the inter-field aliasing interference becoming a flicker component of 30 Hz and the value of the inter-frame aliasing interference becoming a flicker component of 15 Hz, the signal subjected to processing which has a larger in aliasing interference is switched by the switching circuit 21 to be outputted.

Accordingly, a signal that has no aliasing interferences due to inter-field and inter-frame offset sub-samplings can be obtained from the switching circuit 21.

Figure 4:
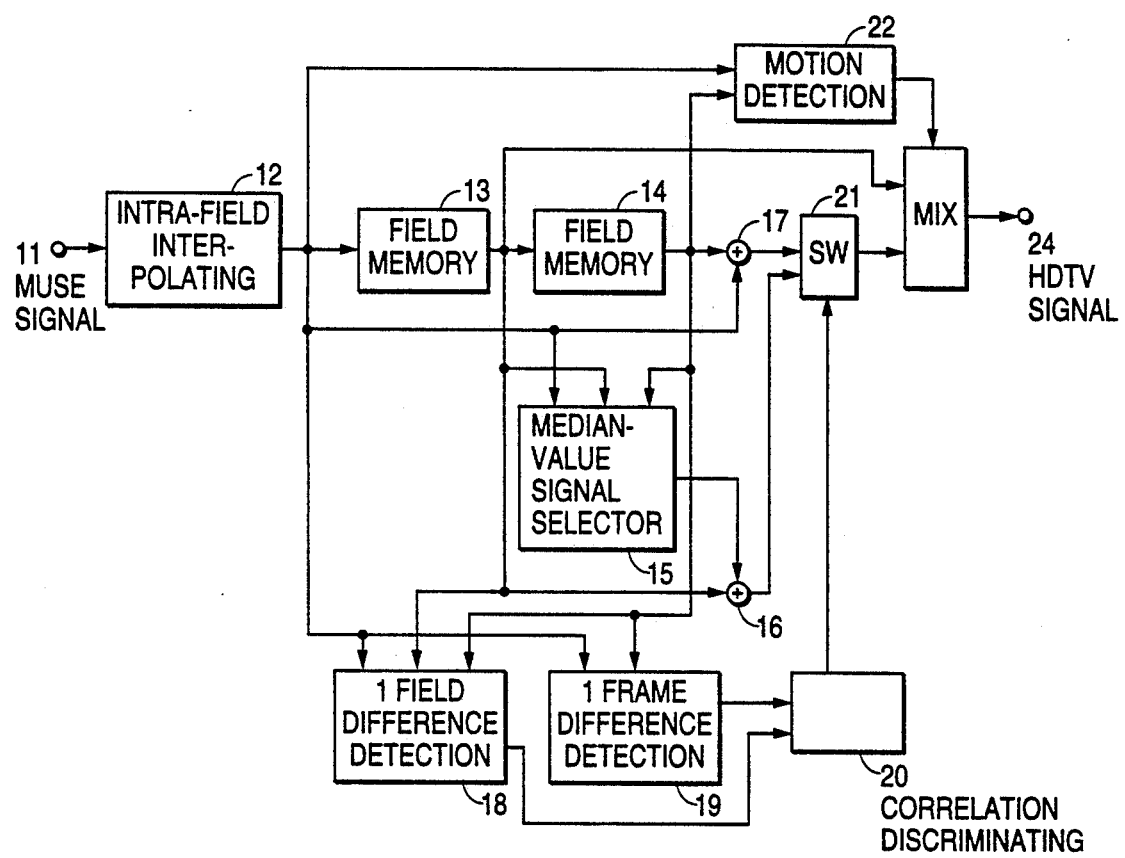
FIG. 4 is a block diagram of a video signal processing apparatus for reducing aliasing interference according to a second embodiment of this invention.

FIG. 4 is a block diagram of a video signal processing apparatus for reducing aliasing interference according to a second embodiment of this invention. A median-value signal selector 15 for extracting a median-value signal of three adjacent inter-field signals is additionally added to the apparatus of the first embodiment so as to be disposed before the adder 16, and other components are the same as those in the first embodiment and indicated by the same referential designations as above.

In order to obtain a signal that has aliasing interference due to inter-field offset sub-sampling, the median-value signal selector 15 extracts a median-value signal of three adjacent inter-field signals from input/output signals of the field memories 13 and 14. Then, the median-value signal and the output signal of the memory 13 are subjected to averaging process through the adder 16 to obtain a signal having aliasing interference eliminated.

Figure 7:
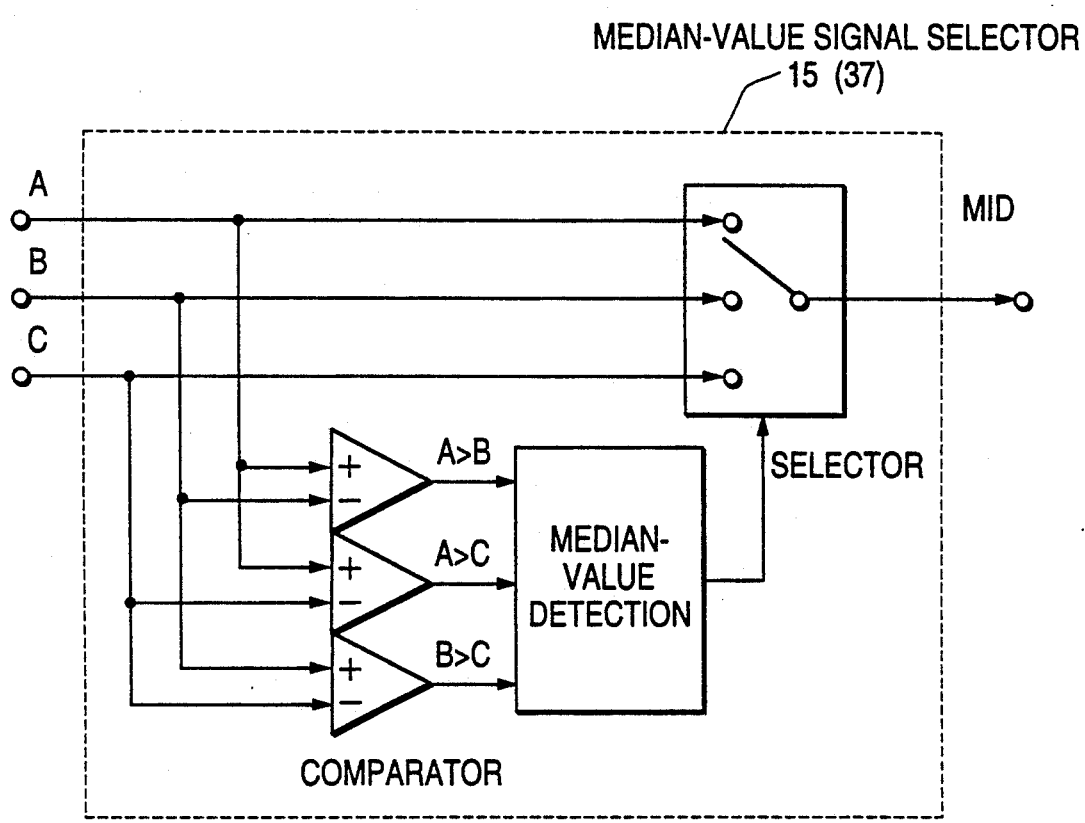
FIG. 7 is a block diagram of a median-value selection circuit in the apparatus shown in FIGS. 2 and 4.

In addition, the median-value signal selector 15 compares, as shown in FIG. 7, the magnitudes of the two respective signals of three signals inputted with each other to detect a median-value signal on an amplitude selection basis therefrom. The selection means is switched in accordance with the thus detected result to output the median-value signal In addition, the median-value signal selector 15 is not limited to that shown in FIG. 7, but any circuit can be used for this purpose if it can extract a median-value signal. Theoretical values of median-value selection in the median-value signal selector 15 are tabulated as shown below.

| Magnitude relationship of signals (ascending order) | | | Outputs of comparator | | | Selected signals |
|---|---|---|---|---|---|---|
| A | B | C | A > B | A > C | B > C | MID |
| 2 | 1 | 3 | 0 | 1 | 1 | A |
| 2 | 3 | 1 | 1 | 0 | 0 | A |
| 1 | 2 | 3 | 1 | 1 | 1 | B |
| 3 | 2 | 1 | 0 | 0 | 0 | B |
| 1 | 3 | 2 | 1 | 1 | 0 | C |
| 3 | 1 | 2 | 0 | 0 | 1 | C |
| 1 | 1 | 2 | 1 | 1 | 1 | B |
| 2 | 2 | 1 | 1 | 0 | 0 | A |
| 1 | 2 | 1 | 1 | 1 | 0 | C |
| 2 | 1 | 2 | 0 | 1 | 1 | A |
| 2 | 1 | 1 | 0 | 0 | 1 | C |
| 1 | 2 | 2 | 1 | 1 | 1 | B |
| 1 | 1 | 1 | 1 | 1 | 1 | B |

Next, the operation for eliminating aliasing interference will be explained in detail while referring to FIGS. 8(a)-8(c) which are waveform diagrams for explaining the operation of eliminating aliasing interference as an example.

Figure 8A:
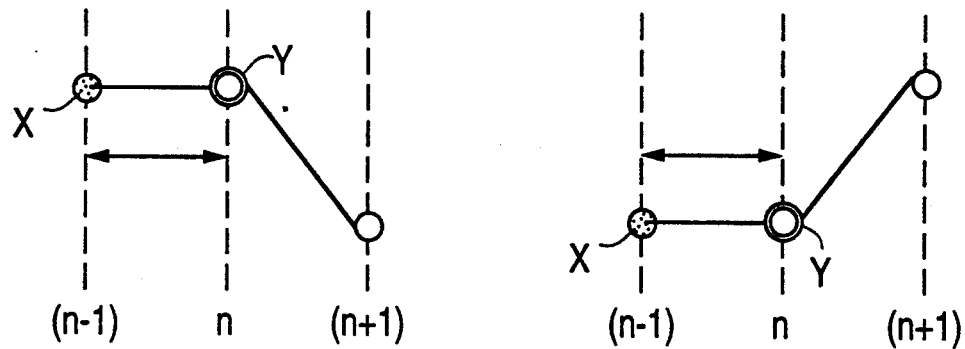
FIGS. 8(A)–8(C) are waveform diagrams for explaining the operation of eliminating an inter-field aliasing interference in the apparatus shown in FIGS. 2 and 4.
Figure 8B:
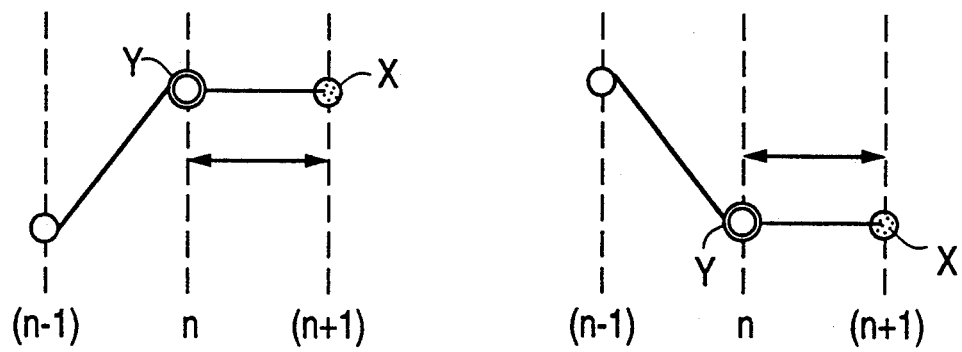
Figure 8C:
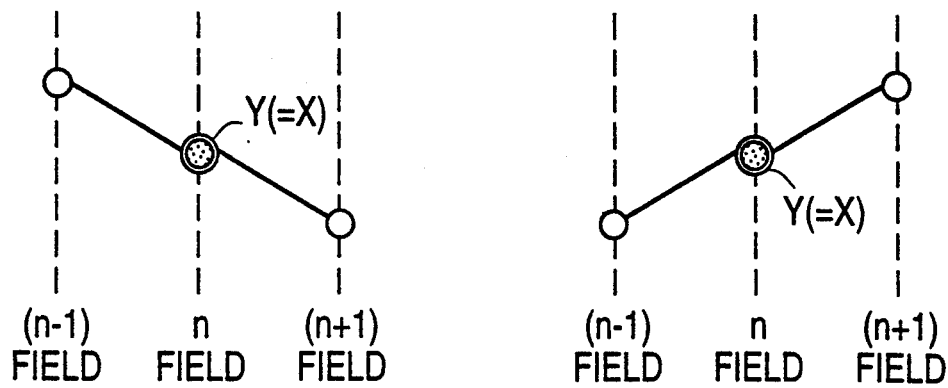
Figure 9:
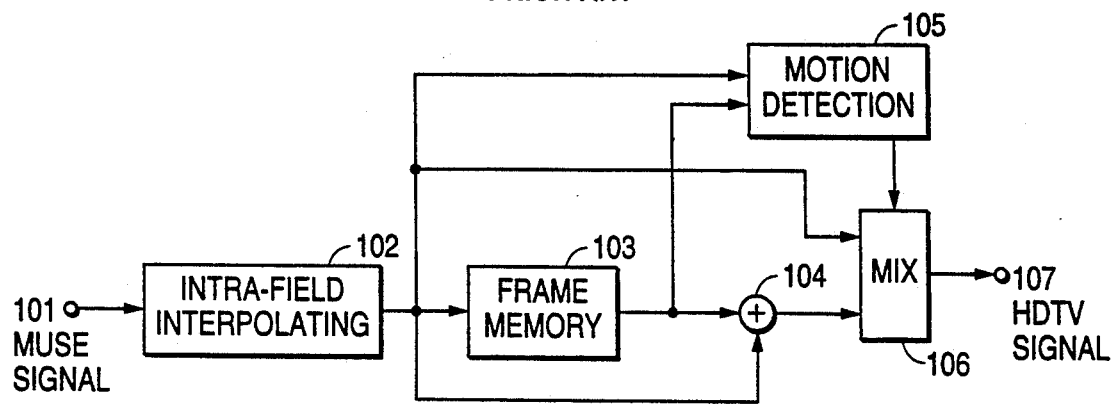
FIG. 9 is a block diagram of a prior art video signal processing apparatus for reducing aliasing interference.
Figure 10:
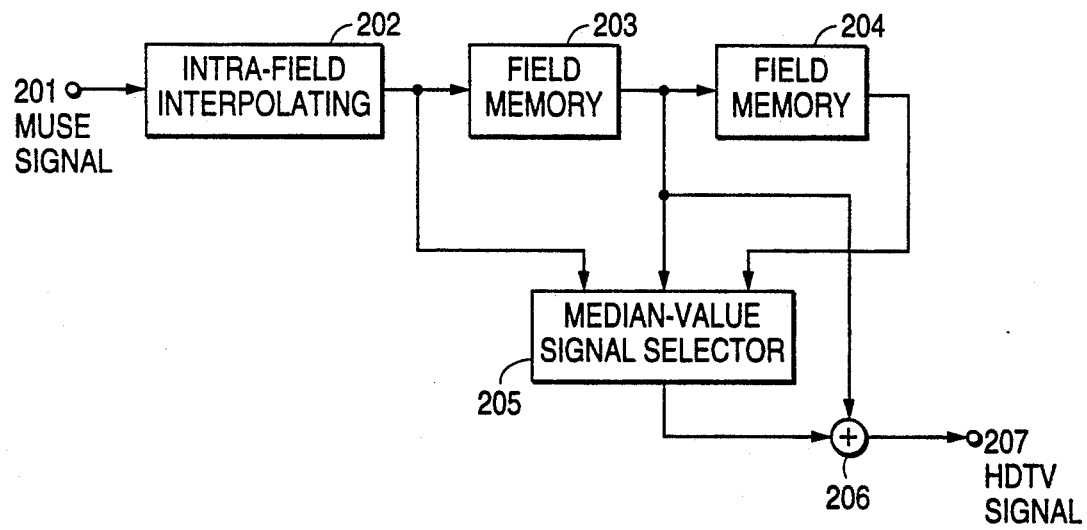
FIG. 10 is a block diagram of another prior art video signal processing apparatus for reducing aliasing interference.
Figure 11:
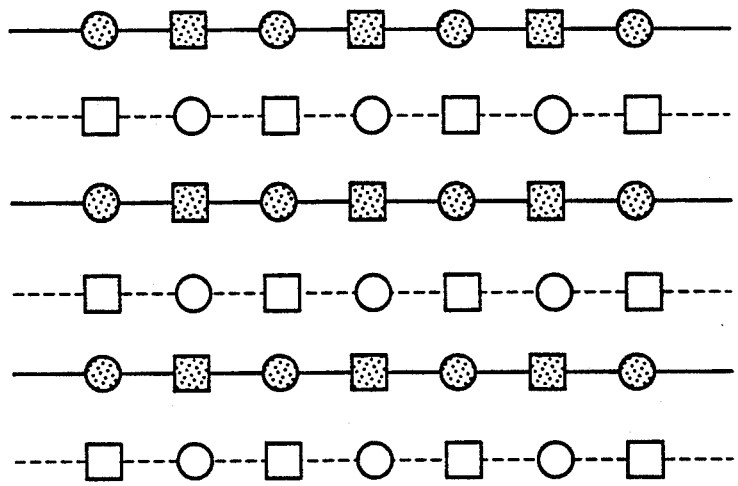
FIG. 11 is a diagram for explaining the principle of a bandwidth compression method by MUSE system offset sub-sampling.
Figure 12A:
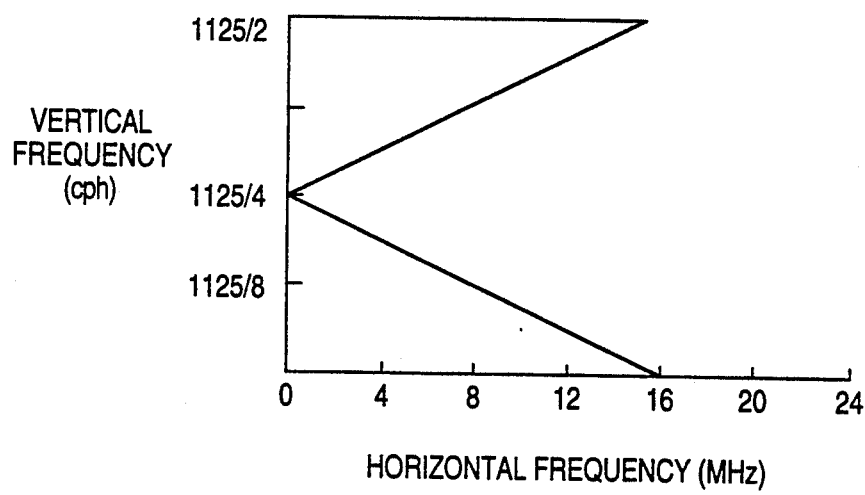
FIGS. 12(a)–12(b) are frequency characteristics charts for explaining the occurrence of aliasing interference due to MUSE system offset sub-sampling in intra-field interpolation.
Figure 12B:
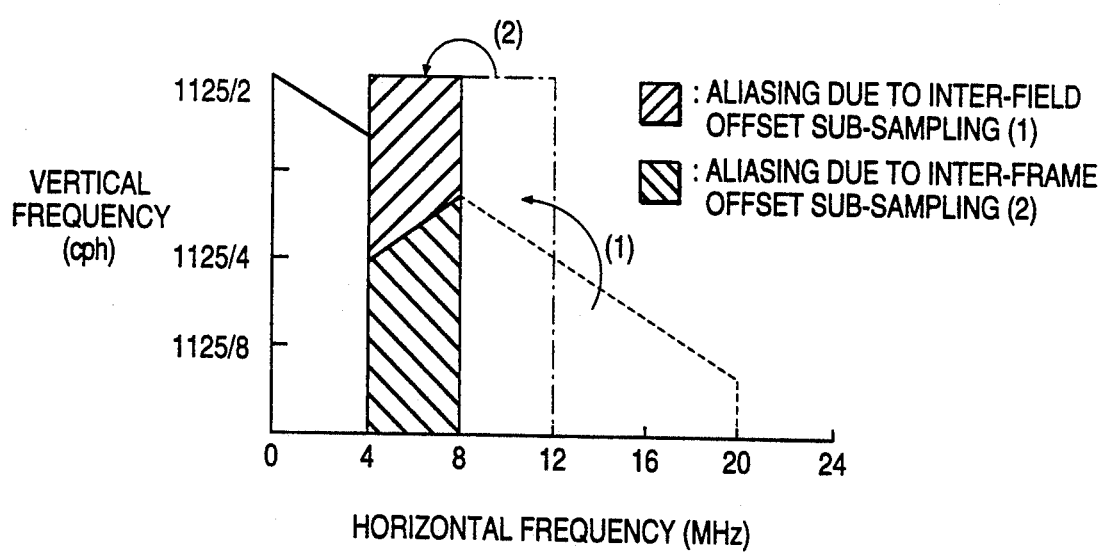

In a stationary area or at a changing point of motion, a median-value signal X (shown by ● marks in FIGS. 8(a)-8(c)) output through the median-value signal selector 15 becomes a signal before or after a signal Y of the present field (shown by ⊙ marks in FIGS. 8(a)-8(c) as shown in FIGS. 8(a) and 8(b)–. Accordingly, by being subjected to the inter-field averaging process on the median-value signal X and the signal Y of the present field through the adder 16, the aliasing component due to inter-field offset sub-sampling can be eliminated. On the other hand, in a moving area where an inputted television signal has motion, as shown in FIG. 8(c), the median-value signal X output through the median-value signal selector 15 becomes the signal Y of the present field. This means that the signal Y of the present signal itself can be obtained, resulting in obtaining no degradation in image quality. Accordingly, the averaging process is performed adaptively on inter-field signals high in correlation between adjacent three fields, so that the aliasing interference due to inter-field offset sub-sampling of the MUSE system can be eliminated without giving any effect to the moving image itself. Further, even if the motion detection circuit 22 fails to discriminate the motion of an image, the effect of the inter-field averaging process on the moving image can be made small.

Figure 5:
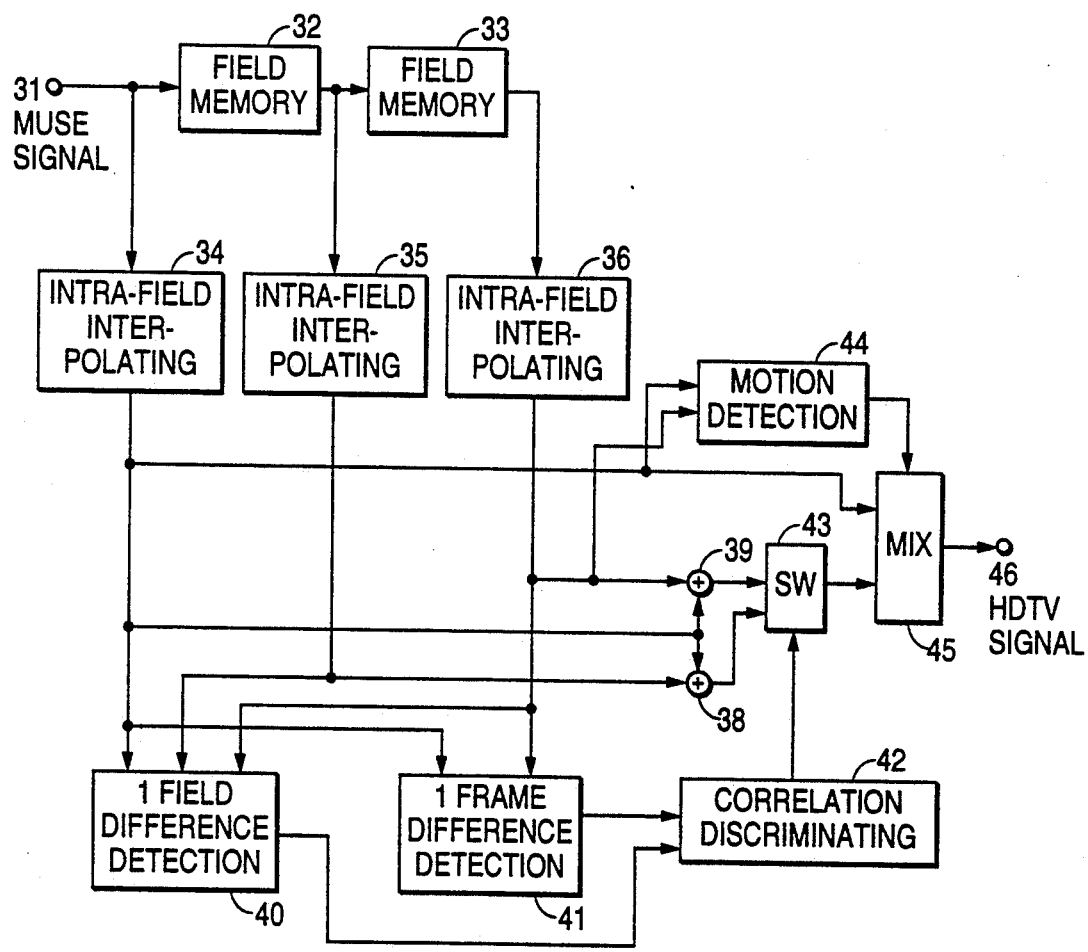
FIG. 5 is a block diagram of a video signal processing apparatus for reducing aliasing interference according to a third embodiment of this invention.

FIG. 5 is a block diagram of a video signal processing apparatus for reducing aliasing interference according to a third embodiment of this invention, which comprises an input terminal 31 for receiving an MUSE signal, field memories 32 and 33, intra-field interpolating circuits 34, 35 and 36 each for interpolating a non-sample point from intra-field sample points in order to restore a bandwidth-compressed MUSE signal, adders 38 and 39 for performing averaging processes, a one field difference detection circuit 40 for detecting aliasing interference due to inter-field offset sub-sampling, a one frame difference detection circuit 41 for detecting aliasing interference due to inter-frame offset sub-sampling, a correlation discriminating circuit 42 for determining the larger one of the inter-field and inter-frame aliasing interferences, and a signal switching circuit 43, further comprising a motion detection circuit 44, a mixing circuit 45 and an output terminal 46 for outputting a high definition television signal having aliasing interferences eliminated.

The operation of this apparatus will be explained below. A MUSE signal inputted from the input terminal 31 is stored in the field memories 32 and 33 connected in series. Then, subjected to interpolation of a non-sample point from an intra-field sample point for a bandwidth-compressed signal of each of three adjacent fields. Next, an output signal of the interpolating circuit 34 and an output signal of the interpolating circuit 35 are subjected to an inter-field averaging process through the adder 38 to obtain a signal having aliasing interference due to inter-field offset sub-sampling eliminated. On the other hand, an output signal of the interpolating circuit 34 and an output signal of the interpolating circuit 36 are subjected to inter-frame averaging process through the adder 39 to obtain a signal having aliasing interference due to inter-frame offset sub-sampling eliminated. In addition, interpolated signals of three adjacent fields of the interpolating circuits 34, 35 and 36 are fed to the one field difference detection circuit 40 and one frame difference detection circuit 41 to respectively detect the aliasing interference due to inter-field offset sub-sampling and the aliasing interference ,due to inter-frame offset sub-sampling. And then, the larger of inter-field and inter-frame aliasing interferences is determined by through the correlation discriminating circuit. Then, the switching circuit 43 controls the signal outputted from the adder 38 and having no the aliasing interference due to inter-field sub-sampling by performing inter-field averaging process between the present field and correlative adjacent one before or after and the signal outputted from the adder 39 and having no aliasing interference due to inter-frame offset sub-sampling, so that the signal having eliminated the larger of these inter-field and inter-frame aliasing interferences can be passed therethrough.

In addition, the motion detection circuit 44 detects the motion of an image according to the output signal of the interpolating circuit 34 and that of the interpolating circuit 36. Then, the signal outputted from the signal switching circuit 43 and subjected to inter-field or inter-frame averaging process and the signal outputted from the interpolating circuit 34 and subjected to the inter-field process only are mixed with each other through the mixing circuit 45 in accordance with the motion of an image thus detected. Accordingly, even in the case of moving image, a signal having no degradation (occurrence of double image or the like) results and having aliasing interferences substantially eliminated can be obtained from the output terminal 46.

As explained above, according to this embodiment, by disposing field memories for obtaining three adjacent inter-field signals so as to store a television signal before interpolation, aliasing interferences due to inter-field and inter-frame offset sub-samplings of the MUSE, system can be almost perfectly eliminated and the capacity of a field memory to be used can be reduced in half.

Figure 6:
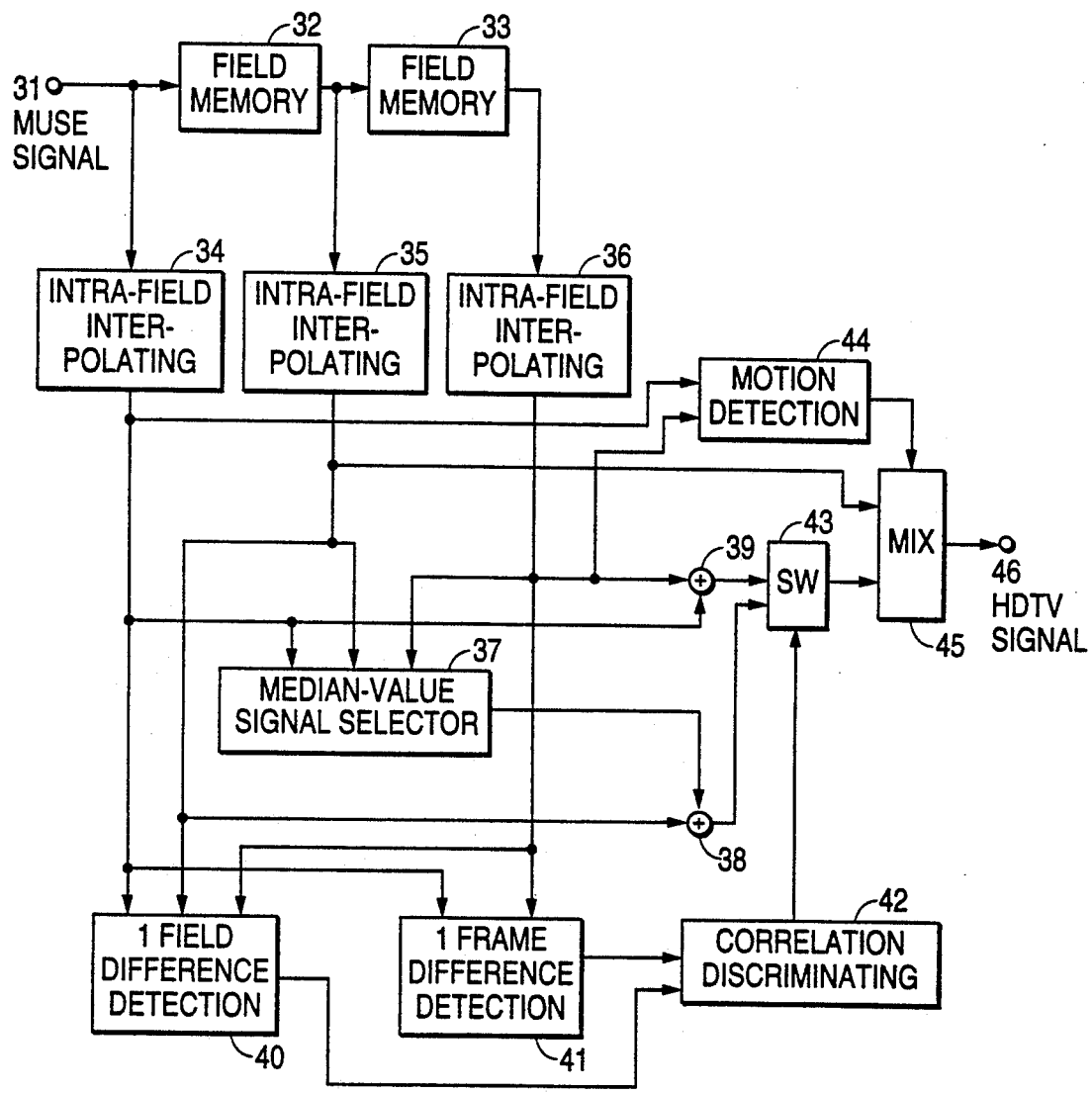
FIG. 6 is a block diagram of a video signal processing apparatus for reducing aliasing interference according to a fourth embodiment of this invention.

FIG. 6 is a block diagram of a video signal processing apparatus for reducing aliasing interference according to a fourth embodiment of this invention. The apparatus of this embodiment has a median-value signal selector 37 for extracting a median-value signal of three adjacent inter-field signals disposed before the adder 38 of the third embodiment. Other components are the same as those of the third embodiment and indicated by the same reference designations as above.

In order to obtain a signal having no aliasing interference due to inter-field offset subsampling, the median-value signal selector 37 extracts a median-value signal of the three adjacent interfield signals from the output signals of the interpolating circuits 34, 35 and 36. The median-value signal is subjected to averaging process with an output signal of the interpolating circuit 35 through the adder 38 to obtain a signal having an no aliasing interference As a result, in a fashion similar to the second embodiment, even when the motion detection circuit 44 fails to discriminate the motion of an image, the effect on the moving image in the inter-field averaging process can be reduced.

In addition, the one field difference detection circuit 18 in the first and second embodiments is arranged so as to use all of the three adjacent inter-field signals. However, it may be arranged so as to detect an inter-field difference either before or after the present field. Also, the motion detection circuit 22 detects the motion of an image from one inter-frame signal. However, the circuit may detect the motion from two inter-frame signals by further outputting one additional inter-frame signal. In the third and fourth embodiments, the one field difference detection circuit 40 is also arranged so as to use all of the three adjacent inter-field signals. However, it may be arranged so as to detect an inter-field difference either before or after the present field. The motion detection circuit 44 detects the motion of an image from one inter-frame signal which is subjected to interpolating process. However, it may detect the motion from one inter-frame signal which is before interpolating process to be performed. In a fashion similar to the first and second embodiments, the motion may be detected from two inter-frame signals.

What is claimed is:

1. A video signal processing apparatus for reducing aliasing interference comprising:
    an interpolating means which receives a high definition television signal which has been bandwidth-compressed by offset sub-sampling for interpolating a non-sample point from intra-field sample points of a sub-sampled signal;
    a field averaging means for performing an inter-field averaging process from data of three adjacent fields of a signal thus interpolated;
    a frame averaging means for performing an inter-frame averaging process; and
    a correlation discriminating means connected to a signal switching means for detecting one field difference and one frame difference and for switching an output signal of said inter-field averaging means and an output signal of said inter-frame averaging means in accordance with magnitudes of the differences thus detected.

2. A video signal processing apparatus according to claim 1, further comprising:
    a motion detection circuit for detecting a motion of an image from data of three adjacent fields of an interpolated signal; and
    a mixing circuit for mixing an output signal of said signal switching means and an output signal of said interpolating means in accordance with the motion of an image thus detected.

3. A video signal processing apparatus for reducing aliasing interference comprising:
    an interpolating means which receives a high definition television signal which has been bandwidth-compressed by offset sub-sampling for interpolating a non-sample point from intra-field sample points to a sub-sampled signal;
    a first memory means for delaying a signal thus interpolated for one field period;
    a second memory means for delaying an output signal of said first memory means for a further one field period;
    a first adder means for performing an inter-field averaging process from an input signal of said first memory means and an output signal of said second memory means;
    a second adder means for performing an inter-frame averaging process from an input signal of said first memory means and an output signal of said second memory means;
    a correlation discriminating means for detecting one field difference and one frame difference from input and output signals of said first and second memory means and for outputting a switching signal in accordance with magnitudes of the difference thus detected; and
    signal switching means for switching an output signal of said first adder means and an output signal of said second adder means in accordance with the switching signal from said correlation discriminating means.

4. A video signal processing apparatus according to claim 3, further comprising:
    a motion detection circuit for detecting a motion of an image from an input signal of said first memory and an output signal of said second memory; and
    a mixing circuit for mixing an output signal of said switching means and an input signal of said first memory means in accordance with the motion of an image thus detected.

5. A video signal processing apparatus for reducing aliasing interference comprising:
    a first memory means for delaying a high definition television signal which has been bandwidth-compressed by offset sub-sampling for one field period;

a second memory means for delaying an output signal of said first memory means for a further one field period;

first, second and third interpolating means for interpolating non-sampling points from intra-field sample points of a sub-sampled signal in accordance with input and output signals of said first and second memory means;

a first adder means for performing an inter-field averaging process from an output signal of said first interpolating means and an output signal of said second interpolating means;

a second adder means for performing an inter-frame averaging process from an output signal of said first interpolating means and an output signal of said third interpolating means;

a correlation discriminating means for detecting one field difference and one frame difference from output signals of said first, second and third interpolating means and for outputting a switching signal in accordance with magnitudes of differences thus detected; and a signal switching means for switching an output signal of said first adder means and an output signal of said second adder means in accordance with the switching signal from said correlation discriminating means.

6. A video signal processing apparatus according to claim 5, further comprising:

a motion detection circuit for detecting a motion of an image from an output signal of said first interpolating means and an output signal of said third interpolating means; and a mixing circuit for mixing an output signal of said signal switching means and an output signal of said first interpolating means in accordance with the motion of an image thus detected.

7. A video signal processing apparatus according to claim 5, further comprising:

a motion detection circuit for detecting a motion of an image from an input signal of said first memory means and an output signal of said second memory means; and a mixing circuit for mixing an output signal of said signal switching means and an output signal of said first interpolating means in accordance with the motion of an image thus detected.

8. A video signal processing apparatus for reducing aliasing interference comprising:

an interpolating means which receives a high definition television signal which has been bandwidth-compressed by offset sub-sampling for interpolating a non-sample point from intra-field sample points of a sub-sampled signal;

a first memory means for delaying a signal thus interpolated for one field period;

a second memory means for delaying an output signal of said first memory means for a further one field period;

a median-value signal selection means for extracting a median-value signal of three adjacent inter-field signals from input and output signals of said first and second adder means;

a first adder means for averaging an output signal of said first adder means and an output signal of said median-value signal selection means;

a second adder means for performing an inter-frame averaging process from an input signal of said first memory means and an output signal of said second memory means;

a correlation discriminating means for detecting one field difference and one frame difference from input and output signals of said first and second memory means and for outputting a switching signal in accordance with magnitudes of differences thus detected;

and a signal switching means for switching an output signal of said first adder means an output signal of said second adder means in accordance with the switching signal from said correlation discriminating means.

9. A video signal processing apparatus according to claim 8, further comprising:

a motion detection circuit for detecting a motion of an image from an input signal of said first memory means and an output signal of said second memory means; and mixing means for mixing an output signal of said signal switching means and an output signal of said first memory means in accordance with the motion of an image thus detected.

10. A video signal processing apparatus for reducing aliasing interference comprising:

a first memory means for delaying a high definition television signal which has been bandwidth-compressed by offset sub-sampling for one field period;

a second memory means for delaying an output signal of said first memory means for a further one field period;

a first, second and third interpolating means for interpolating non-sample points from intra-field sample points of a sub-sampled signal in accordance with input and output signals of said first and second memory means;

a median-value signal selection means for extracting a median-value signal of three adjacent inter-field signals from output signals of said first, second and third interpolating means;

a first adder means for averaging an output signal of said second interpolating means and an output signal of said median-value signal selection means;

a second adder means for performing an inter-frame averaging process from an output signal of said first interpolating means and an output signal of said third interpolating means;

a correlation discriminating means for detecting one field difference and one frame difference from output signals of said first, second and third interpolating circuits and for outputting a switching signal in accordance with the magnitudes of differences thus detected; and a signal switching means for switching an output signal of said adder means and an output signal of said second adder means in accordance with the switching signal from said correlation discriminating means.

11. A video signal processing apparatus according to claim 10, further comprising:

a motion detection circuit for detecting a motion of an image from an output signal of said first interpolating means and an output signal of said third interpolating means; and a mixing circuit for mixing an output signal of said signal switching means and an output signal of said second interpolating means in accordance with the motion of an image thus detected.

12. A video signal processing apparatus according to claim 11, further comprising:
   a motion detection circuit for detecting a motion of an image from an input signal of said first memory means and an output signal of said second memory means; and
   a mixing circuit for mixing an output signal of said signal switching means and an output signal of said second interpolating means.

* * * * *